Patented Feb. 14, 1933

1,897,110

UNITED STATES PATENT OFFICE

PAUL C. BOWERS, OF PENNS GROVE, NEW JERSEY, ASSIGNOR TO E. I. DU PONT DE NEMOURS & COMPANY, OF WILMINGTON, DELAWARE, A CORPORATION OF DELAWARE

PROCESS OF PURIFYING PHTHALIC ANHYDRIDE

No Drawing. Application filed August 24, 1929. Serial No. 388,267.

This invention relates to the purification of phthalic anhydride which has been prepared by the catalytic oxidation of naphthalene, and it relates more particularly to the treatment of phthalic anhydride by heating with a condensing agent to convert volatile impurities into non-volatile form, so that the phthalic anhydride may be recovered by suitable vaporization.

This application is a continuation in part; the parent application being copending application Serial No. 597,417 filed by applicant on October 27, 1922, which has matured into Number 1,728,225 granted September 17, 1929.

I have discovered that the volatile impurities which are ordinarily present in crude phthalic anhydride prepared by the vapor phase oxidation of naphthalene in the presence of a catalyst, are readily converted by certain condensing agents into relatively non-volatile substances. Among the impurities in this type of process may be mentioned quinones or quinonic bodies, and the condensing agents suitable for the purification comprise certain acid bodies containing the $SO_4$ or $HSO_4$ group. The new process is applicable to the purification of phthalic anhydride either by distillation under reduced pressure or by sublimation.

If the crude phthalic anhydride is subjected to distillation, either at atmospheric pressure or under vacuum without the presence of one of the condensing agents mentioned, the product, although improved by distillation, shows some color, either pink, yellow, or gray, in the molten condition, or when allowed to solidify in bulk, even though it may appear perfectly white when ground. If, however, the crude phthalic anhydride is distilled in the presence of a small amount of one of the above-mentioned condensing agents, the distilled product is almost or entirely free from color either when molten or when allowed to solidify in compact form. It would be difficult to determine quantitatively the difference between the two distilled products, but the color which shows in the product distilled without a condensing agent also causes difficulty in certain operations which involve a reaction with phthalic anhydride.

The process should preferably be carried out about as follows: The crude phthalic anhydride is melted and agitated. The condensing agent is added in amount sufficient to hold back the impurities, generally 0.25 to 1.0% of the weight of the crude. The treated crude material is (1) either distilled (or sublimed) directly; or is (2) first heated, with agitation, preferably to about its boiling point at atmospheric pressure, the crude phthalic anhydride transferred into the still or sublimer, and distillation of sublimation performed at either atmospheric or reduced pressure.

Bodies containing the $SO_4$ radical or the $HSO_4$ group comprise acid sodium sulphate, acid potassium sulphate, sulphuric acid, and the like, which have a pronounced acidic character. These are used in a manner similar to the process above described. Various sulphonic acids, and the like, which have a pronounced acidic character, may also be used in a manner similar to the process above described.

Although the conditions set forth in the above specific examples are considered preferable, it will be understood that various changes may be made in these conditions of operation; thus, after the condensing agent is added to the crude phthalic anhydride, the mixture can be heated to a temperature substantially less than its boiling point until condensation of the volatile impurities is completed. In some cases it will be advantageous to allow the heated molten mass to stand until at least a part of the impurities have settled out, before conveying the phthalic anhydride to the still or sublimer.

I claim:

1. The process of purifying crude phthalic anhydride prepared by the vapor phase catalytic oxidation of naphthalene, which comprises treating it with a condensing agent comprising an acidic material having an $SO_4$ group, and vaporizing the phthalic anhydride from the relatively non-volatile impurities.

2. The process of purifying crude phthalic anhydride prepared by the vapor phase catalytic oxidation of naphthalene, which comprises treating it with a condensing agent comprising an acidic material having an $HSO_4$ group, and vaporizing the phthalic anhydride from the relatively non-volatile impurities.

3. The process of purifying crude phthalic anhydride prepared by the vapor phase catalytic oxidation of naphthalene, which comprises treating it with a condensing agent comprising sodium hydrogen sulphate, and vaporizing the phthalic anhydride from the relatively non-volatile impurities.

4. The process of purifying crude phthalic anhydride prepared by the vapor phase catalytic oxidation of naphthalene, which comprises treating it with a condensing agent comprising an acidic material in the proportion of .25 to 1% having an $SO_4$ group, and vaporizing the phthalic anhydride from the relatively non-volatile impurities.

5. The process of purifying crude phthalic anhydride prepared by the vapor phase catalytic oxidation of naphthalene, which comprises treating it with a condensing agent comprising an acidic material from the group consisting of acid sodium sulphate, acid potassium sulphate and sulphonic acids, and vaporizing the phthalic anhydride from the relatively non-volatile impurities.

In testimony whereof, I affix my signature.

PAUL C. BOWERS.